United States Patent
Minick et al.

(10) Patent No.: US 7,413,149 B2
(45) Date of Patent: Aug. 19, 2008

(54) WING ENHANCEMENT THROUGH ION ENTRAINMENT OF MEDIA

(75) Inventors: Alan B. Minick, Stuart, FL (US); Benjamin Goldberg, Palm City, FL (US); Larry Knauer, Jupiter, FL (US)

(73) Assignee: United Technologies Corporation, Hartford, CT (US)

(*) Notice: Subject to any disclaimer, the term of this patent is extended or adjusted under 35 U.S.C. 154(b) by 386 days.

(21) Appl. No.: 10/895,774

(22) Filed: Jul. 21, 2004

(65) Prior Publication Data

US 2006/0038087 A1   Feb. 23, 2006

(51) Int. Cl.
*B64C 21/00* (2006.01)
(52) U.S. Cl. .................................................. 244/205
(58) Field of Classification Search ................. 244/205, 244/198, 201, 204
See application file for complete search history.

(56) References Cited

U.S. PATENT DOCUMENTS

| | | | | |
|---|---|---|---|---|
| 3,095,163 A | * | 6/1963 | Hill | 244/12.1 |
| 3,446,464 A | * | 5/1969 | Donald | 244/130 |
| 6,247,671 B1 | * | 6/2001 | Saeks et al. | 244/205 |
| 6,796,532 B2 | * | 9/2004 | Malmuth et al. | 244/204 |
| 6,805,325 B1 | * | 10/2004 | Malmuth et al. | 244/205 |

* cited by examiner

*Primary Examiner*—John W Eldred
(74) *Attorney, Agent, or Firm*—Bachman & LaPointe, P.C.

(57) ABSTRACT

A system for augmenting the apparent velocity and effectiveness of an airfoil, such as a wing, on a vehicle includes at least one ionizer or emitter positioned relative to the airfoil to ionize a fluid media in which the airfoil travels and at least one attractor/receiver for accelerating the flow of ionized fluid media over the airfoil. The system further includes a voltage source to which each ionizer and each attractor is electrically connected.

19 Claims, 1 Drawing Sheet

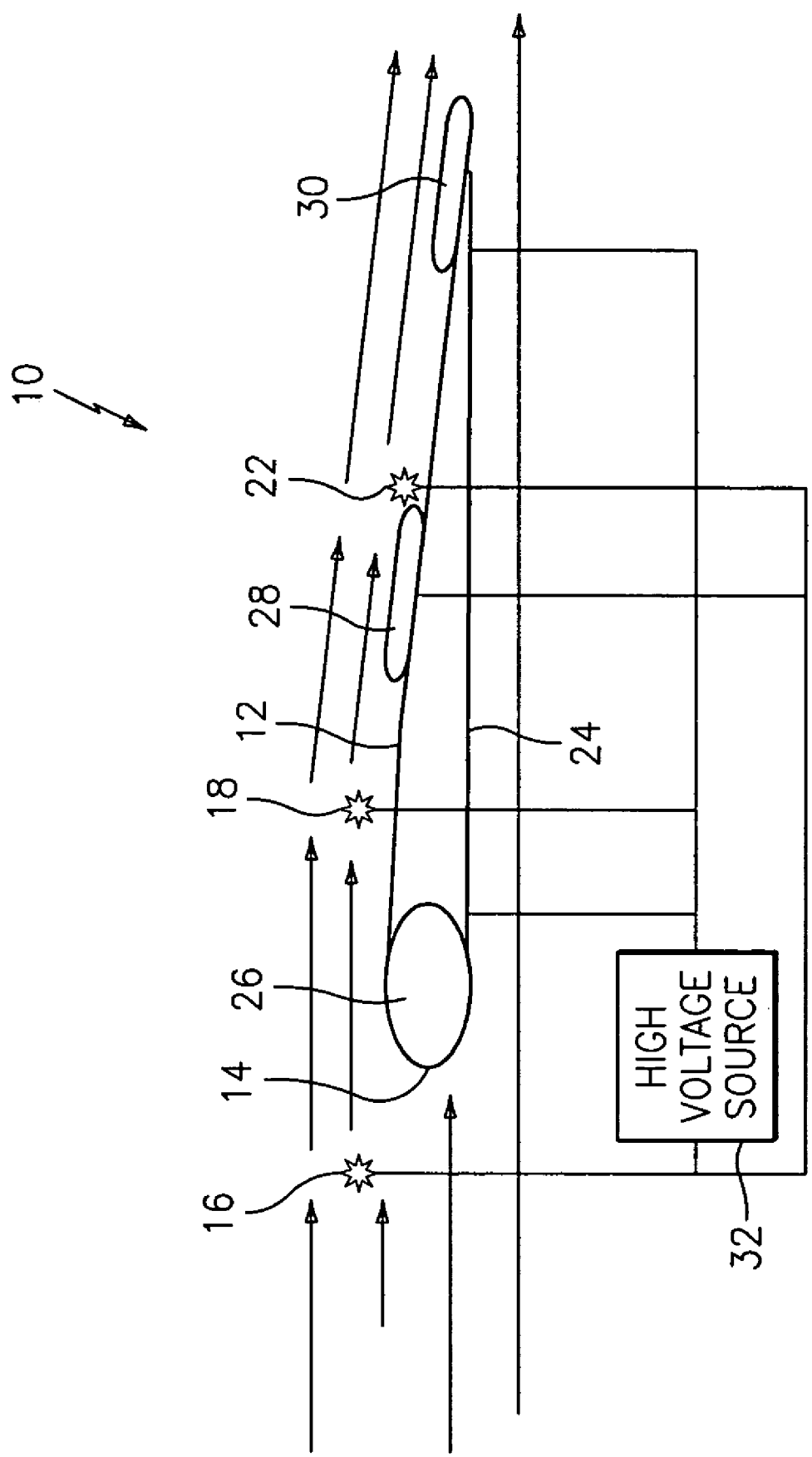

WING ENHANCEMENT THROUGH ION ENTRAINMENT OF MEDIA

BACKGROUND OF THE INVENTION (1) Field of the Invention

The present invention relates to a system and a method for enhancing the effectiveness of an airfoil, such as a wing, as it moves through the atmosphere.

(2) Prior Art

The use of intense electric fields to create ions has been commonly used in many applications. Repulsion of like charges after ionization has been used to accelerate ions away from the ionization source. The recognition of this effect has given rise to thoughts about using this approach as a possible propulsion source.

While thoughts have been given to the possibility of a propulsion source, there remains a need for a system for enhancing the performance or effectiveness of an airfoil as it travels through the atmosphere.

SUMMARY OF THE INVENTION

Accordingly, it is an object of the present invention to provide a system and a method for enhancing the effectiveness of an airfoil.

It is a further object of the present invention to provide a system and a method as above for augmenting the apparent velocity of the airfoil.

The foregoing objects are attained by the system and the method of the present invention.

In accordance with the present invention, a system for augmenting the apparent velocity and effectiveness of an airfoil, such as a wing, on a vehicle is provided. The system broadly comprises means positioned relative to the airfoil to ionize a fluid media in which the airfoil travels and means for accelerating the flow of ionized fluid media over the airfoil.

Further in accordance with the present invention, a method for augmenting the apparent velocity and effectiveness of an airfoil, such as a wing, on a vehicle is provided. The method broadly comprises the steps of ionizing a fluid media in which the airfoil travels and accelerating the flow of ionized fluid media over the airfoil.

Other details of the wing enhancement through ion entrainment of media of the present invention, as well as other objects and advantages attendant thereto, are set forth in the following detailed description and the accompanying drawings wherein like reference numerals depict like elements.

BRIEF DESCRIPTION OF THE DRAWINGS

The FIGURE illustrates an airfoil enhancement system in accordance with the present invention.

DETAILED DESCRIPTION OF THE PREFERRED EMBODIMENT(S)

Referring now to the FIGURE, a system 10 for augmenting the apparent velocity and effectiveness of an airfoil, such as a wing 12, is illustrated. The system 10 comprises a first emitter or ionizer 16 positioned ahead of or on the leading edge 14 of the airfoil or wing 12. The first emitter 16 may be mounted to the leading edge 14 of the airfoil or wing 12 using any suitable electrically non-conductive or insulated means known in the art. Alternatively, the first emitter 16 may be mounted to a portion of a vehicle (not shown) to which the airfoil or wing 12 is mounted. As before, the first emitter 16 may be preferably mounted to the-vehicle using any suitable electrically non-conductive or insulated means known in the art. Additional emitters or ionizers 18 and 20 may be positioned above or on an upper surface 22 of the airfoil or wing 12. If desired, one or more of the emitters could be positioned below or on a lower surface 24 of the airfoil or wing 12. As before, the emitters 18 and 20 may be mounted to the airfoil or wing 12 or to the body of a vehicle.

The system 10 further has a first attractor 26 which is preferably located in or mounted to a region adjacent to or behind the leading edge 14 of the airfoil or wing 12. Additional attractors 28 and 30 may be positioned along the airfoil or wing 12. For example, the attractor 28 may be located in a mid-span region and the attractor 30 may be located in a trailing edge region. The additional attractors 28 and 30 may be attached to the upper surface 22 and/or to the lower surface 24 of the airfoil or wing 12.

Each of the emitters 16, 18, and 20 and each of the attractors 26, 28, and 30 may be formed from any suitable electrically conductive material known in the art. For example, each of the emitters and attractors may be formed from a carbon fiber material or from nanotubes.

Each emitter 16, 18, and 20 is an ionization feature and thus is preferably much smaller in area than each attractor 26, 28, and 30. In fact, the smaller and the sharper each emitter is, the better the effect, though multiple emitters may be combined in a cluster within each emitter 16, 18, and 20. If desired, the emitters 16, 18, and 20 may be augmented with alpha particle emitters, such as americium, to further enhance the ionization of the fluid media surrounding and flowing over the airfoil or wing 12.

As shown in the FIGURE, the emitters 16, 18, and 20 and the attractors 26, 28, and 30 are electrically connected to a high voltage source 32. The high voltage source 32 may be positioned in any desired location on the vehicle to which the wing 12 is mounted and may be a DC source or a pulsating direct current (PDC) source. The emitters 16, 18 and 20 and the attractors 26, 28, and 30 are electrically connected to form a plurality of stages or pairs with each stage or pair containing one of the emitters and one of the attractors. Each of the stages or pairs should be electrically isolated so as to prevent reverse flow of oppositely charged particles and a reduction in the wing enhancement effects. Two measures may be used to accomplish this isolation. The first is to reverse the polarity of adjacent emitter-attractor pairs. This is demonstrated in the FIGURE. The second is to position the subsequent emitter downstream of the prior stage diffused receiver field. Since these are similarly polarized, reverse flow is prevented while augmenting the attractive field strength of the prior attractor.

The enhancement system of the present invention applies the complementary capability of attracting ions toward an oppositely charged plate to accelerate both the ionized atmosphere and additional entrained atmosphere across the surface(s) of an airfoil or wing 12 to augment the apparent velocity and airfoil effectiveness. The system 10 of the present invention may also be applied to airfoil surfaces, other than wing surfaces, or to non-airfoil surfaces to enhance the atmospheric flow and/or thrust. Combinations of concentrated and distributed fields may be used in sequence to repeatedly accelerate the ions and atmosphere, further enhancing wing effectiveness.

In operation, a high intensity electric field is generated on a reduced surface area emitter placed in the vicinity of an increased surface area receiver. The concentrated field around each emitter ionizes the adjacent atmosphere which is accelerated towards the less concentrated attractor field mounted further aft on the airfoil or wing upper and/or lower surfaces, as applicable. The created ion bears the same charge as the ionizing source, is repelled and attracted to the attractor plate with a diffused field insufficient to initiate ionization but strong enough to attract the ions generated at the ionization source. This attraction both continues to accelerate the ion and accelerates the receiver/attractor toward the created ions. Both actions add to the forward propulsion of the vehicle to which the airfoil or wing is attached. As the ions travel towards the attractor, collision with other atmospheric molecules causes acceleration of non-ionized entrained atmosphere that further adds to the flow across the airfoil or wing. Additional ionizers and attractors may be added to the same airfoil or wing or other surfaces but should be configured to prevent reverse flow of oppositely charged particles that would reduce the system effectiveness. Measures to accomplish this isolation include reversing the polarity of adjacent emitter-attractor pairs and positioning the subsequent emitters/ionizers downstream of the prior stage diffused attractor field. Since these are similarly polarized, reverse flow is prevented while augmenting the attractive field strength of the prior attractor.

The enhancement system 10 of the present invention may be used on a variety of vehicles having a variety of airfoils and/or wings. For example, the enhancement system of the present invention may be used on high altitude propulsion vehicles, lifting bodies, and gliders. It may be used for station keeping, attitude control, differential thrust and lift, and steering in the atmosphere and/or for silent propulsion of a vehicle.

While the enhancement system 10 has been illustrated on only one wing, each wing of the vehicle may be provided with the enhancement system of the present invention. Other airfoils or surfaces on the vehicle can be provided with the enhancement system as well.

It is apparent that there has been provided in accordance with the present invention a wing enhancement through ion entrainment of media which fully satisfies the objects, means, and advantages set forth herein before. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A system for augmenting the apparent velocity and effectiveness of an airfoil on a vehicle comprising:
    means positioned relative to the airfoil to ionize a fluid media in which the airfoil travels;
    said ionization means comprising at least one emitter;
    means for accelerating the flow of ionized fluid media over the airfoil;
    said accelerating means comprising at least one attractor; and
    each said emitter having a first surface area and each said attractor having a second surface area which is greater than said first surface area.

2. A system according to claim 1, wherein said ionization means comprises a first emitter positioned forward of a leading edge of said airfoil.

3. A system according to claim 2, wherein said ionization means further comprises at least one additional emitter positioned above an upper surface of said airfoil.

4. A system according to claim 1, wherein said ionization means comprises a first emitter positioned on a leading edge of said airfoil.

5. A system according to claim 4, wherein said ionization means further comprises at least one additional emitter positioned above an upper surface of said airfoil.

6. A system according to claim 1, wherein said accelerating means comprises an attractor located adjacent a leading edge of said airfoil.

7. A system according to claim 6, wherein said accelerating means further comprises at least one additional attractor positioned along at least one of an upper surface and a lower surface of said airfoil.

8. A system according to claim 1, further comprising a voltage source attached to said ionization means and said accelerating means.

9. A system according to claim 8, wherein said voltage source comprises a direct current source.

10. A system according to claim 8, wherein said voltage source comprises a pulsating direct current source.

11. A system according to claim 1, further comprising said ionizing means and said accelerating means being configured to prevent reverse flow of oppositely charged particles.

12. A system according to claim 11, wherein said ionizing means comprises a plurality of ionizers and said accelerating means comprises a plurality of attractors, wherein said ionizers and attractors are configured into a plurality of pairs, and wherein adjacent pairs of ionizers and attractors have reversed polarity.

13. A method for enhancing the effectiveness of an airfoil as said airfoil travels through a fluid media, said method comprising the steps of:
    placing at least one emitter having a first surface area relative to said airfoil;
    placing at least one attractor having a second surface area which is greater than said first surface area relative to said airfoil;
    ionizing a portion of the fluid media in which the airfoil travels using said at least one emitter; and
    accelerating the flow of ionized fluid media over the airfoil using said at least one attractor.

14. A method according to claim 13, wherein said at least one emitter placing step comprises positioning a first emitter in front of a leading edge of said airfoil and applying a first charge to said first emitter.

15. A method according to claim 14, wherein said at least one emitter placing step comprises positioning at least one additional emitter downstream of said first emitter and applying a second charge to said at least one additional emitter.

16. A method according to claim 13, wherein said at least one attractor placing step comprises placing a first attractor adjacent a leading edge of said airfoil.

17. A method according to claim 16, wherein said at least one attractor placing step comprises placing at least one additional attractor downstream of said first attractor.

18. A method according to claim 17, wherein said at least one additional attractor placing step comprises placing said at least one attractor adjacent at least one of an upper surface and a lower surface of said airfoil.

19. A method for enhancing the effectiveness of an airfoil as said airfoil travels through a fluid media, said method comprising the steps of:
    providing pairs of ionizers and attractors relative to said airfoil;
    said ionizers and attractors providing step comprises providing an ionizer having a first surface area in each of said pairs and an attractor having a second surface area greater than said first surface area in each of said pairs;
    providing a charge to said ionizers to ionize said fluid media;
    providing a charge to said attractors for accelerating said ionized fluid media over at least one surface of said airfoil; and configuring adjacent pairs of said ionizers and attractors to prevent reverse flow of oppositely charged particles.

* * * * *